Oct. 4, 1932.   R. F. TERNES   1,881,001

VULCANIZING APPARATUS

Filed April 28, 1930

INVENTOR.
Raymond F. Ternes
BY
ATTORNEYS.

Patented Oct. 4, 1932

1,881,001

UNITED STATES PATENT OFFICE

RAYMOND F. TERNES, OF DETROIT, MICHIGAN, ASSIGNOR TO MORGAN & WRIGHT, OF DETROIT, MICHIGAN, A CORPORATION OF MICHIGAN

VULCANIZING APPARATUS

Application filed April 28, 1930. Serial No. 447,862.

My invention relates to vulcanizing apparatus, and more particularly to quickly attachable connections for curing bags used therein.

In vulcanizing apparatus, and particularly in vulcanizing apparatus for tires, the shapes to be vulcanized are placed in a mold and fluid under pressure is applied to the shapes for holding them against the mold walls during the vulcanizing operation. The fluid is under considerable pressure and the problem of providing a suitable connection between a source of fluid under compression and the interior of the shapes in the mold has given considerable difficulty. Where threaded couplings are used, considerable time is lost in attaching the couplings and detaching them.

Heretofore a common method of supplying the interior of a curing bag with fluid under pressure has been to permanently insert and attach a metallic connnector in the body of the curing bag. The connectors have usually had their stems embedded in the rubber, although some devices have proposed to clamp the stems in place. The use of metallic stems affixed to such bags is objectionable by reason of the distortion to which the bags are subjected when being inserted and removed from tire carcasses. Such usage tends to loosen the stems and eventually leakage occurs around the stems.

I provide vulcanizing apparatus in which a curing bag is provided with an unobstructed opening in alinement with an opening in the mold when the latter is closed. Upon the assembly of the mold and curing bag, a nozzle is thrust through the alined openings in the mold and curing bag for inflating the latter. Provision is made for quickly locking the nozzle in a fixed position relative to a mold during the inflating operation. Upon the completion of the inflating operation the nozzle is withdrawn. If it is desired to circulate fluid through the curing bag, a plurality of such openings is provided.

Figure 1:
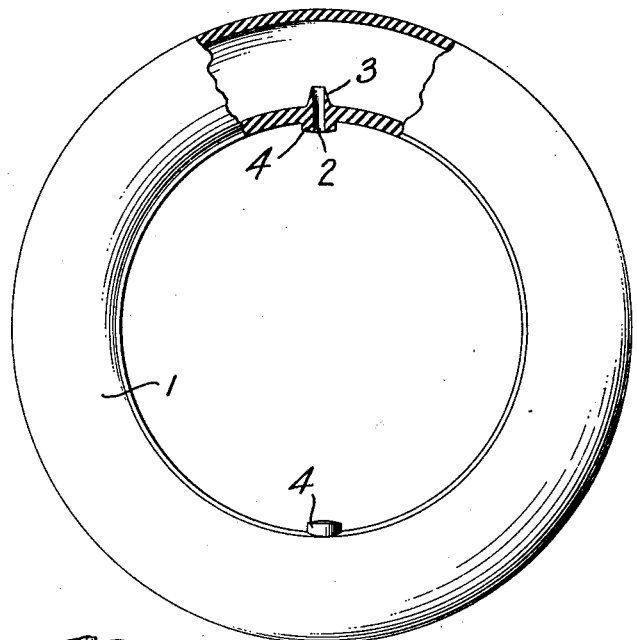
Figure 2:
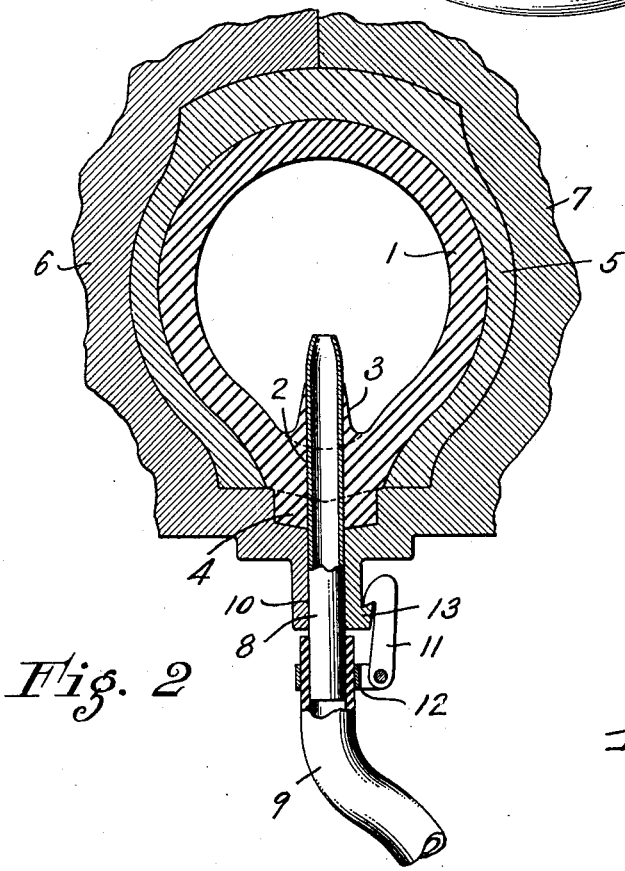

The accompanying drawing illustrates a present preferred embodiment of my invention, in which Figure 1 is a side view partially in elevation and partially in section, of a curing bag adapted for use in my invention; and Fig. 2 is a transverse sectional view of a portion of a mold with a tire carcass and curing bag enclosed therein, showing the means for inflating the curing bag.

Referring to the drawing, a curing bag 1 is provided with one or more apertures 2 disposed along its inner periphery. The number of such apertures varies in accordance with the use to which the bag is to be put. Where it is merely desired to extend the bag, a single aperture will suffice, but where it is desired to circulate fluid within the bag, a plurality of apertures is provided. Each of the apertures 2 is surrounded by a sleeve 3 extending inwardly of the bag and a projection 4 extending outwardly from the bag. The sleeve 3 and projection 4 increase the mass of the material adjacent the aperture.

In vulcanizing a shaped article, illustrated as a tire casing 5, although it is to be understood that the invention is applicable to other shapes, the casing 5 and curing bag 1 are assembled and placed within mold sections 6 and 7. The mold sections 6 and 7 are shaped to conform to the projection 4 for locating the latter along the internal periphery of the assembled mold sections.

For providing fluid under pressure to the curing bag 1, a nozzle or connector stem 8 is attached to a supply or drain line by a flexible hose 9. The nozzle 8 fits loosely within an aperture 10 formed by the mold halves and snugly engages the material of the curing bag as the nozzle extends through the projection 4 and sleeve 3, thereby constituting a fluid tight connection. Preferably, the nozzle 8 is tapered to facilitate its insertion in the bag 1. The length of the nozzle is sufficient so it will project into the interior of the bag 1 far enough to pass the thin edges of the sleeve 3. Upon the transmission of fluid under pressure to the interior of the curing bag, the pressure applied to the outer edges of the sleeve 3 causes the latter to press against the connector 8 for preventing the passage of fluid therearound.

To insure retention of the nozzle 8 in its proper position during the transmission of fluid, a quickly detachable connection is made between the nozzle and the mold. This connection is illustrated in the form of a hook or latch 11 mounted on a hose clamp 12 secured to the hose 9. The latch 11 co-operates with a catch 13 carried by the mold section 7.

In operation the casing 5 and curing bag 1 is placed in one of the mold sections with the projection or projections 4 in alinement with a seat or seats in the mold. After positioning and clamping the second half of the mold, the connector stem is inserted into the alined apertures formed in the mold halves and the curing bag, the latch 11 is hooked onto the catch 13 and fluid is permitted to traverse the nozzle 8 and hose 9 by the manipulation of valve mechanism, not shown. It is to be understood that in practice the mold sections 6 and 7 are provided with openings for the circulation of a heating medium.

While I have shown and described a present preferred embodiment of my invention, it is to be understood that it may be otherwise embodied within the spirit of the invention and the scope of the appended claims.

Having thus described my invention, what I claim and desire to protect by Letters Patent is:

1. A vulcanizing device comprising a mold, a curing bag disposed therein, said bag and mold having alined unobstructed openings, and a member insertable into said openings from the exterior of the mold for supplying fluid under pressure to the interior of the bag.

2. A vulcanizing device comprising a mold, a curing bag disposed therein, said bag and mold having alined openings, a member insertable into said openings from the exterior of the mold for supplying fluid under pressure to the interior of the bag, and clamping means for securing said member to the mold.

3. A vulcanizing device comprising a plurality of complementary mold sections, a curing bag disposed therein, said bag and mold sections having alined unobstructed openings, and a member insertable into said openings from the exterior of the mold for supplying fluid under pressure to the interior of the bag.

4. A vulcanizing device comprising a plurality of complementary mold sections, a curing bag disposed therein, said bag and mold sections having alined openings, a member insertable into said openings from the exterior of the mold for supplying fluid under pressure to the interior of the bag, and quickly detachable locking means for retaining said member in fixed position relative to the bag.

5. A vulcanizing device comprising a mold, a curing bag disposed therein, said bag and mold having alined openings, a nozzle insertable into said openings from the exterior of the mold, a hook movable with said nozzle, and a co-operating catch carried by one of said mold sections.

6. A vulcanizing device comprising a plurality of complementary mold sections, a curing bag disposed therein, a nozzle insertable from the exterior of the mold through an opening in said bag, a latch carried by said nozzle, and a catch mounted on one of said mold sections for co-operation with the latch.

Signed at Detroit, county of Wayne, State of Michigan, this 23rd day of April, 1930.

RAYMOND F. TERNES.